United States Patent [19]

Zemel et al.

[11] 4,332,157
[45] Jun. 1, 1982

[54] PYROELECTRIC ANEMOMETER

[75] Inventors: Jay N. Zemel, Jenkintown; Hamid Rahnamai, Philadelphia, both of Pa.

[73] Assignee: Trustees of the University of Pennsylvania, Philadelphia, Pa.

[21] Appl. No.: 182,683

[22] Filed: Aug. 29, 1980

[51] Int. Cl.$^3$ .......................... G01F 1/68; G01N 25/18
[52] U.S. Cl. ........................................... 73/26; 73/204; 310/306
[58] Field of Search .................... 73/26, 204; 310/306, 310/343

[56] References Cited

U.S. PATENT DOCUMENTS

| | | | |
|---|---|---|---|
| 3,519,924 | 7/1970 | Burton | 73/204 X |
| 3,531,663 | 9/1970 | King, Jr. | 310/343 |
| 3,733,499 | 5/1973 | Deis | 310/306 |

*Primary Examiner*—Herbert Goldstein
*Attorney, Agent, or Firm*—Ferguson, Baker, Whitham, Spooner & Kroboth

[57] ABSTRACT

Disclosed is a pyroelectric anemometer capable of providing an accurate indication of fluid flow rate. A pyroelectric substrate has a heater element located essentially transverse to the fluid flow direction. Sensor electrodes also transverse to the fluid flow direction are located upstream and downstream of the heater electrode. A fluctuating power supply is connected to the heater electrode which results in a fluctuating voltage at each sensor electrode. The amplitude of the fluctuations at the electrodes are compared and the difference in amplitude of fluctuations is indicative of the flow rate of fluid flowing thereover. Preferred embodiments utilize a differential amplifier to compare the fluctuating amplitudes and provides an output to a lock-in-amplifier which provides a fluid flow rate indicator output.

17 Claims, 6 Drawing Figures

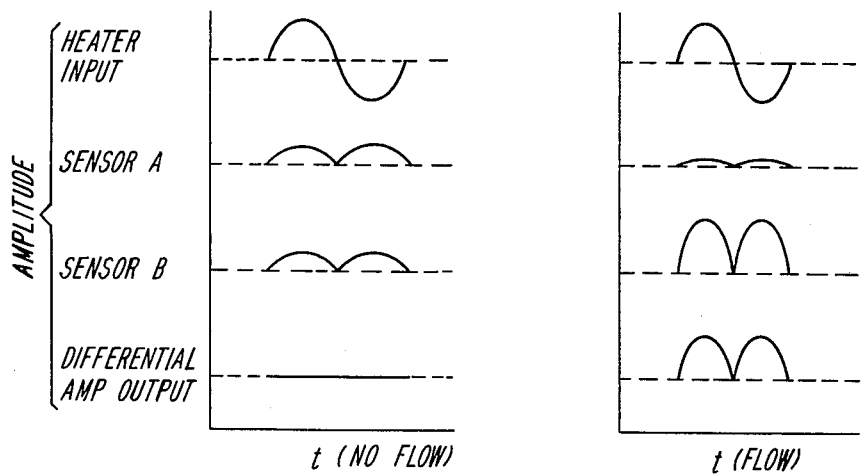
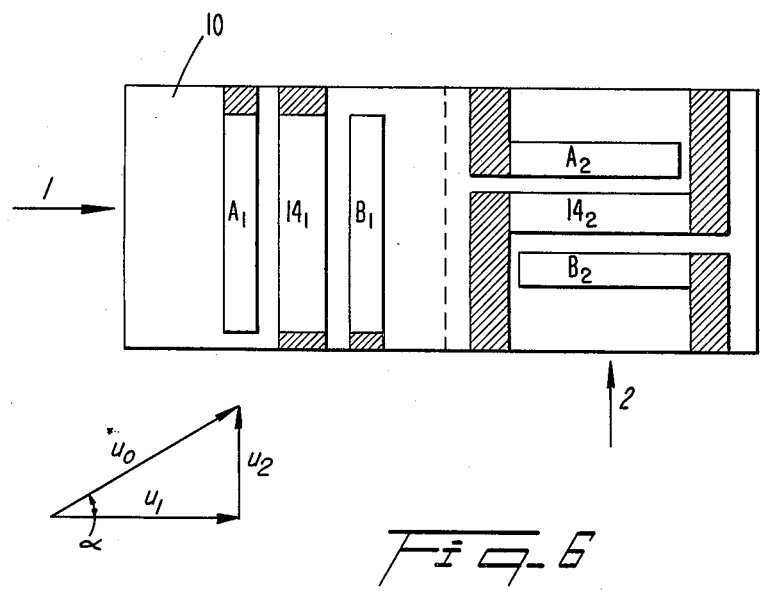

PYROELECTRIC ANEMOMETER

BACKGROUND OF THE INVENTION

The present invention relates to the measurement of fluid flow in general and to a pyroelectric anemometer in particular.

The measurement of fluid flow is fundamental to many scientific and technological areas. In the past mechanical systems which rotate and with the rotation generate a signal which is indicative of flow velocity have been used extensively and are well known embodiments. However, to increase the reliability and decrease the size of anemometers in particular, there has been increasing interest in the development of flow measuring systems that are based upon semiconductor and other solid state phenomena. The hot wire anemometer (HWA) utilizes the heat transfer from a hot wire as an indication of flow velocity. These devices although well developed, remain expensive and difficult to use.

Many of the difficulties with respect to the HWA have not been overcome even with the most recent solid state devices such as the thermistor anemometer, the transistor anemometer, and the integrated silicon anemometer. The first two types of anemometers are discussed at the February 1980 issue of IEEE Spectrum in an article entitled "Microprocessors get Integrated Sensors" by Middelhoek, Angell, and Noorlag at page 42. In a thermistor anemometer, air flowing over a resistor cools the resistor and changes its resistance which resistance is an indication of flow velocity. In the transistor type anemometer, a heating transistor heats up a small integrated circuit chip over which the fluid whose velocity is to be measured is flowing. Upstream and downstream transistors are, respectively, cooled and heated by the flowing gas in combination with the heating transistor. The difference in temperature between the two transistors causes a variation in their gain and thus their output signal and are indicative of flow velocity. Unfortunately, the output signal from the transistor anemometer is a non-linear function of the flow velocity unless a number of conditions are met and substantial signal processing is utilized.

A further type of flow measuring device is disclosed in U.S. Pat. No. 3,519,924 to Burton in which a piezoelectric oscillator is heated by a heating element and the heat transfer from the oscillator to the fluid is a function of the fluid velocity and can be measured by comparing the frequency of oscillation of the test oscillator with an isolated reference oscillator.

SUMMARY OF THE INVENTION

In accordance with the above disadvantages of prior art anemometers, it is an object of the present invention to provide an anemometer having an electrical output which is a function of the velocity of fluid flow in the device.

It is a further object of the present invention to provide a flow measuring device which is inexpensive and relatively easy to use.

It is a still further object of the present invention to provide an inexpensive but precise anemometer for the measurements of flow velocities.

It is an additional object of the present invention to provide accurate indications of the thermal conductivity of a fluid.

The above and other objects are achieved in accordance with the present invention by utilizing pyroelectric materials which have a high thermal sensitivity in conjunction with a heater element to provide a voltage output which, when squared, is proportional to the velocity of the gas flow. Upstream and downstream electrodes on a pyroelectric substrate measure the charge redistribution due to heat from a centrally located heating element on the substrate. When a flow is present over the substrate, the upstream electrode will be cooled to a greater extent than will the downstream electrode and thus its temperature will be lower and thus the charge redistribution associated with the electrode will be less than the charge distribution associated with the downstream electrode. The electrodes are connected to a differential amplifier whose output is connected to a further amplifier and an electronic meter. There is further provided a means for heating the substrate in a fluctuating manner in order to permit the necessary charge redistribution. As the temperature of the heater varies, the output of the two electrodes will vary and in addition the amplitude of their outputs is affected depending on whether they are upstream or downstream of the heating element. The extent of the difference in the signal from the two electrodes is indicative of the flow velocity.

BRIEF DESCRIPTION OF THE DRAWINGS

A more complete appreciation of the invention and the attendant advantages thereof will be more clearly understood by reference to the following drawings wherein:

FIG. 5 is a comparison of two graphs indicating heater input, sensor A and sensor B outputs and the differential amplifier output of FIG. 4; and FIG. 6 is a plan view of an anemometer for providing both flow rate and direction information.

DETAILED DESCRIPTION OF PREFERRED EMBODIMENTS

In certain classes of non-cubic crystal, the electric polarization along a certain crystallographic axis may not vanish. Changing the temperature in such crystals, produces a change in the electric polarization. This phenomenon is referred to as the pyroelectric effect and the parameter relating the temperature change and the surface charge is called the pyroelectric coefficient. All pyroelectric crystals have non-centrosymmetric structures and, as a consequence, are also piezoelectric.

Thus, if a small substrate of pyroelectric material has suitable electrodes attached thereto, and is heated, a surface charge will be formed which can be measured at the electrodes. However, it can also be seen that the induced surface charge on the electrodes will gradually discharge through the external measuring circuitry to produce a net zero charge on the electrodes when the pyroelectric substrate has been maintained at an elevated temperature for some period of time. Because of this reason, pyroelectric structures have not been considered for use in flow measurement applications. For example, if a small heater were utilized to raise the temperature of the substrate a charge would be developed. However over a period of time this charge would redistribute back to produce a net zero voltage across the electrodes. Should the substrate be cooled to a certain extent by fluid flowing over the substrate (while it was being heated) the substrate temperature would drop and initially there would be a measurable charge difference. However, this would again leak away to zero while the fluid flow rate remained the same. Thus adapting such a pyroelectric device to flow measurement would be even more complex than the extensive electrical manipulations necessary for the transistor anemometer to provide a proper output indication of flow velocity.

However, it has been found that the application of a fluctuating heat input to the pyroelectric substrate will result in a constantly shifting charge distribution with the amount of fluctuating charge proportional to the magnitude of the temperature fluctuations which in turn are a function of both the heat input and the fluid flow to be measured. Theoretically, a single heater element on a substrate and a single charge monitoring electrode pair would be sufficient to measure fluid flow velocities. The heater would supply a fluctuating heat input to the substrate whose temperature would produce a thermal wave which was constantly varying. Obviously if fluid was flowing over the substrate the temperature distribution to which the substrate was heated would be different than if no fluid were flowing in the vicinity of the substrate. Consequently the fluctuations in temperature as measured by the fluctuating charge at the electrodes caused by the known fluctuating power input will provide an accurate indication of fluid flow velocity.

Figure 1:
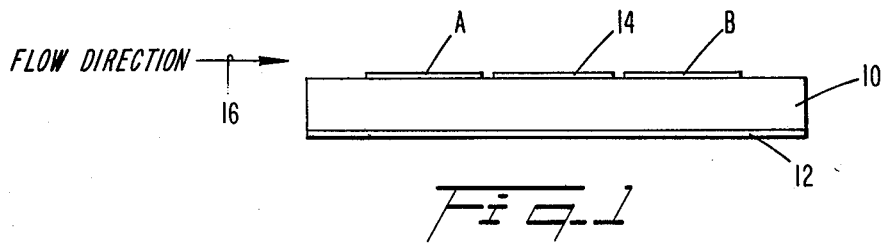
FIG. 1 is a side view partially in section of the pyroelectric anemometer/thermal conductivity indicator.

Referring now to the drawings wherein like reference numerals designate identical parts throughout the several views, FIG. 1 is a cross-sectional view of a pyroelectric substrate 10 having a base electrode 12 thereon. A heater element 14 is centrally disposed on the upper surface of the substrate with adjacent sensor electrodes A and B. The flow direction is indicated by arrow 16. The orientation of the FIG. 1 structure can be seen in plan view FIG. 2 which additionally has heater element leads 18 and sensor electrode leads 20 and 22 for sensor electrodes A and B, respectively. The operation of this embodiment of the present invention is as follows.

Figure 2:
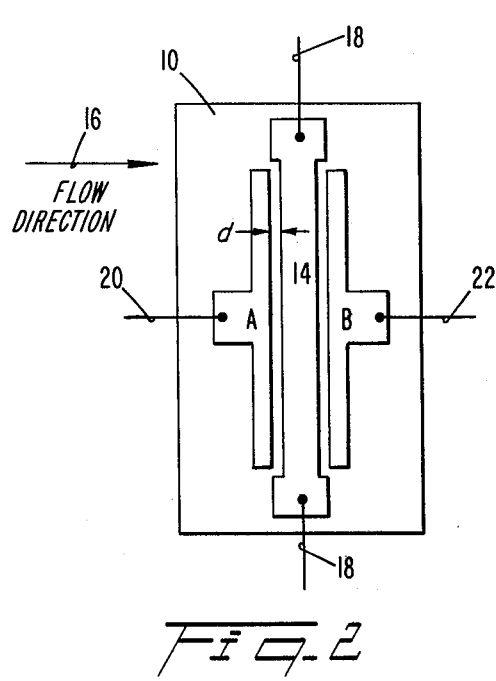
FIG. 2 is a plan view of the pyroelectric anemometer/thermal conductivity indicator of FIG. 1.
Figure 3:
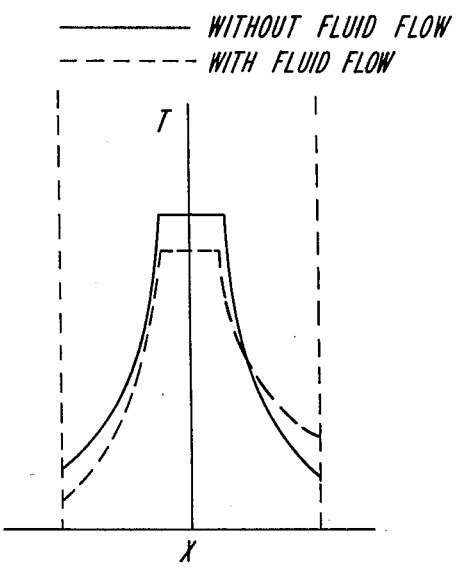
FIG. 3 is a graph of the temperature distribution across the pyroelectric substrate of FIG. 2 with and without fluid flow.

As can be seen in FIG. 3, without fluid flowing over the substrate of FIG. 2, the temperature profile across the surface of the substrate is indicated by the solid line. The highest temperature is at the surface of heater element 14 and that temperature gradually decreases *symmetrically* as the edges of the substrate are reached. However, fluid is flowing over the substrate in the direction of arrow 16, the "upwind" portion of the substrate (covered by sensor A) will be cooled and thus its temperature will be lower than the no-flow condition. Similarly, the "downwind" sensor electrode will have a temperature that will be either the same or slightly higher than the no-flow condition because of the heat carried by the flow from the upwind portion of the substrate. The *non-symmetric* temperature profile during flow conditions is illustrated by a dotted line.

Thus, without flow across the substrate, the pyroelectric charge redistribution output measured at sensor electrode A and sensor electrode B should be identical and there will be no difference between their outputs.

Even with a fluctuating heat input applied to heater element 14, the charge fluctuation output at the sensor electrodes should be equal and in phase even through they will fluctuate and thus the difference between them will still remain zero.

Figure 4:
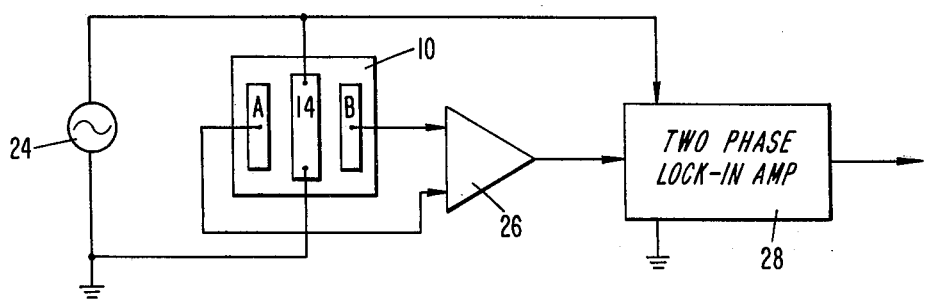
FIG. 4 is an electric schematic of one embodiment of the present invention.

FIG. 4 illustrates the electrical processing circuitry for one embodiment of the present invention in which a sinusoidal output is applied to heater element 14 by fluctuating power supply 24. The base electrode (not shown) would be grounded with sensor electrodes A and B connected to the inputs of a low-noise, high input impedance (on the order of 100 megohms) differential amplifier 26. The differential amplifier provides an output which is a function of the difference in the two inputs. The output is supplied to a two phase lock-in-amplifier 28 which also has a reference input from the fluctuating power supply.

As can be seen in FIG. 5, the heater input from power supply 24 is a sine wave alternating current going both positive and negative. However the negative going portion of the sine wave supplies the same heat pulse as does the positive going portion of the sine wave and consequently the heat pulses supplied to the substrate 10 are at a frequency twice that of the sinusoidal input. Therefore in a preferred embodiment the lock-in-amplifier will be set to the 2F mode with respect to the input reference frequency F. As noted with reference to FIG. 3, in a no-flow situation, it can be seen that sensor electrodes A and B have identical outputs and the differential amplifier would provide no difference output to the lock-in-amplifier.

However where there is a flow, as in the right hand graph of amplitude versus time in FIG. 5, it can be seen that the output from sensor A is substantially reduced in amplitude due to the fact that it is upstream flowwise from the heater element and is cooled by the flow of fluid thereover. The downstream sensor B in addition to being heated by heat transfer through the substrate is also heated by the fluid flowing over the heating element which is transferring heat to the sensor electrode and substrate thereneath and consequently has a substantially larger fluctuating output. Because there is a substantial difference in the outputs of sensor electrodes A and B, the differential amplifier will provide an output fluctuating at the same frequency as the sensor outputs. Obviously, the magnitude of the differential signal will increase with flow rate and eventually will saturate when the redistribution of the thermal heat flow saturates, i.e., the temperature distribution can no longer be influenced by the fluid flow. Thus the output 30 will be a function of the velocity and heat transfer characteristics of the fluid flowing over the pyroelectric anemometer.

In the event that the flow characteristics of the fluid are known, changes in the thermal conductivity of the fluid will be reflected in the output signal. This aspect permits structure identical to the anemometer to be used as a thermal conductivity indicator. This is important in binary gas mixtures in determining the concentration of the gases if they have different thermal conductivites. Thus the thermal conductivity indicator has application in gas and liquid chromatography.

One embodiment of the present invention utilizes z-cut LiTaO$_3$ (lithium tantalate) plates which has one side polished. LiTaO$_3$ has several advantages over other pyroelectric materials. It has a high Curie temperature (891 degrees K), good mechanical behavior and is relatively insensitive to the ambient temperature. Furthermore, it is easy to scribe and break into smaller pieces as is commonly done with silicon wafers and lends itself to photolithograhic procedures. Other materials such as plastic pyroelectrics and other crystalline pyroelectrics can be used for different applications. Although much smaller sizes can be utilized, one embodiment of the present invention comprised a pyroelectric substrate surface area of 4×8 mm with a thickness of either 0.3 mm or, 0.06 mm. Both the sensor electrodes and the heater element 14 comprise vapor deposited nichrome films on the polished side of the pyroelectric substrate. Other materials could be utilized for the heater and/or the sensor electrodes although the nichrome film approximately 1.0 μm thick provides a resistance of around 60 ohms and thus provides a good heater element. Convenience suggests using the same material for the sensor electrodes which can be deposited at the same time. As can be seen in FIG. 2, the electrode/heater separation distance d in preferred embodiments was 0.25 mm or 2.0 mm. In one embodiment, the base electrode 12 was also a vapor deposited nichrome film again due to convenience, although it could just as easily have been aluminum, gold or any other conductor.

As noted earlier, it is necessary to utilize a fluctuating power supply in order to have a changing charge distribution which is then affected by the flow dependent temperature distribution in the substrate. In a preferred embodiment, a 3 hz drive voltage was applied to the heater element. The base electrode 12 is of course necessary in order to comprise a capacitor with the respective sensor electrodes which then permits the pyroelectric effect to generate a charge on the capacitor due to charge displacements in the dielectric material comprising the pyroelectric substrate.

The separation distance d between the heater and the sensor electrodes will affect the flow response of the pyroelectric anemometer. If d is small compared to the width of the heater element, there will be practically no temperature difference between the heater element and the sensor electrode. On the other hand, if this distance is too large in comparison with the heater width, then practically no thermal energy reaches the electrodes. Tests have shown that while d can be as large as 8 mm, if d is approximately equal to the width of the heater element the average temperature in the electrode region is much smaller than the strip temperature but that the electrodes will be close enough to receive substantial heat energy therefrom.

The thickness of the substrate has a substantial effect upon the frequency dependence of the pyroelectric response. For a given thickness, the magnitude of the pyroelectric response decreases as the frequency increases. However, the thinner the pyroelectric substrate, the higher the frequency response. A 3 hz heater drive signal supplied by power supply 24 may be a lower fluctuation frequency limit (the use of frequencies much lower than this causes substantial noise in the sensor electrode outputs) but higher frequencies can be used if the pyroelectric substrate is thin and small enough and the flow velocities to be measured are high enough. Because a higher flow rate transfers heat faster, it will have a higher response time. It has been noted that drive signals above 5 hz are relatively quiet and free from electronic noise which is observed at the lower drive frequencies.

Because a preferred embodiment of the present invention utilizes upstream and downstream sensor electrodes, and in addition measures the difference in temperature between the two, this device is relatively insensitive to the ambient temperature of the fluid flowing thereover in marked contrast to the hot wire anemometer which is very sensitive to ambient flow temperature change.

Because the pyroelectric anemometer is quite conductive to modern semiconductor fabrication technology, the size of the structures can be reduced considerably beyond the dimensions disclosed herein. It is easily conceivable that the total plate area of the anemometer could be 1 $mm^2$ or less. This small size should not cause any serious degradation of the accuracy of the anemometer and should, additionally, increase the response rate thereof. Furthermore, with the modern fabrication technology, the reproduceability of the pyroelectric anemometer is outstanding and it is not unreasonable to expect commercially manufactured anemometers to have identical characteristics within a percent or two.

As touched upon earlier, there are numbers of problems associated with hot wire and hot film anemometers which make them unattractive for use in many applications. Practical problems include difficult electronics, the actual probe mounting the hot wire or hot film anemometer and the necessity for frequent calibration. Problems such as internal noise generated by the probe, the effect of fluid temperature change or its fluctuation and the frequency breakage of the fragile filament caused by shock or vibration of the probe are even more critical. In the thermistor anemometer, the accuracy many times varies between 5 and 50% for wind speeds from 0 to 5 m/sec. It also has non-linear flow characteristics. The transistor anemometer is very highly temperature dependent in that slight variations in the fabrication of the two identical transistors on either side of the heater source will cause changes in their response slopes and consequently a change in the ambient temperature changes the difference voltages which will be reflective of the flow velocity. Additionally, the signal level is relatively low (2 μv per m/sec.) requiring extremely sensitive signal measuring devices.

Because pyroelectric materials have extremely high thermal sensitivities a pyroelectric anemometer can be constructed which has both high sensitivity and a wide range of flow response. Utilizing the application of a fluctuating heat source in combination with the differential measurement, eliminates many of the problems of other anemometers. The sensitivity of the pyroelectric anemometer is such that it can accurately measure gas flow rates as low as 1 cm/min. and as high as 2000 cm/min. with the same instrument. The flow rate response is essentially insensitive to the temperature of the flowing liquid. Depending on the precise application, variations in the pyroelectric substrate thickness, electrode/heater distance, and heater fluctuation frequency can be adjusted for optimum results.

The pyroelectric anemometer also demonstrates a certain amount of direction dependence which meets the empirical equations developed for hot wire anemometers. If the flow direction is perpendicular to the heater and sensor electrodes, the maximum output is achieved and $\alpha$ equals 0 ($\alpha$ is the angle that the flow direction makes with respect to a perpendicular to the heater/sensor electrode orientation). However, as $\alpha$ increases, up to 90 degrees, the output will gradually decrease to 0 in accordance with $U\alpha$ is approximately equal to $U_0 (\cos \alpha)^{\frac{1}{2}}$ where $U\alpha$ is the actual output at the flow angle α and $U_0$ is the output of the flow at α equals 0.

Thus with a known velocity a pyroelectric anemometer could provide a good indication of flow direction. With two pyroelectric anemometers, oriented at 90 degrees with respect to each other as shown in FIG. 6, an accurate indication of both flow rate and direction can be obtained because each anemometer would accurately provide the velocity of a component of the flow perpendicular to its heater/sensor electrode orientation. The Pythagorean theorum would provide the actual flow velocity ($U_{actual}$ equals the square root of $U_1^2 + U_2^2$). Flow direction can be determined because α = arc Tan $U_2/U_1$. Thus two pyroelectric anemometers could provide rate and direction information relatively easily.

Although the invention has been described relative to a specific embodiment thereof, it is not so limited and many modifications and variations thereof will be readily apparent to those skilled in the art in light of the above teachings. It is, therefore, to be understood that, within the scope of the appended claims, the invention may be practiced otherwise than as specifically described.

The embodiments of the invention in which an exclusive property or privilege is claimed are defined as follows:

1. A fluid flow rate indicator comprising:
   a pyroelectric substrate having at least one surface;
   means for applying a fluctuating heat input to said substrate, said input causing a fluctuating surface charge distribution in response to temperature fluctuations of said substrate; and
   electrode means on said surface for sensing a fluctuating surface charge on said surface, said charge fluctuations comprising said fluid flow rate indication.

2. The flow rate indicator according to claim 1, wherein said means for applying comprises:
   a fluctuating power supply; and
   a heater element disposed on said substrate and connected to said fluctuating power supply.

3. The flow rate indicator according to claim 2, wherein said fluid has a flow rate component in a flow direction and said heater element is located transverse to said flow direction, said fluid has a relatively constant thermal conductivity, wherein said electrode means comprises at least two sensor electrodes located on said substrate and essentially parallel to said heater element, said heater element being located between said sensor electrodes and separated therefrom by a distance d.

4. The flow rate indicator according to claim 2 or 3, wherein said fluctuating power supply includes means for providing a sine wave output to said heater element.

5. The flow rate indicator according to one of claims 1 through 3, wherein said substrate is lithium tantalate ($LiTaO_3$).

6. The flow rate indicator according to claim 2 or 3, wherein said heater element is a vapor deposited nichrome strip.

7. The flow rate indicator according to claim 2 or 3, wherein said electrode means comprises two vapor deposited sensor electrodes on said substrate, said electrodes disposed one on either side of said heater element, said electrode means further comprising a differential amplifier means, responsive to charge redistribution at said sensor electrodes, for providing an output which is a function of the difference between outputs of said sensor electrodes.

8. The flow rate indicator according to claim 7, wherein said electrode means further includes a lock-in-amplifier connected to the output of said differential amplifier means, said fluctuating power supply including means providing a sine wave output to said heater element and a reference sine wave output to said lock-in-amplifier, said lock-in-amplifier providing an output indicative of fluid flow rate of said flow rate component.

9. A fluid flow rate indicator comprising:
   a pyroelectric substrate;
   a longitudinal heater element located on the surface of said substrate;
   power supply means for applying a sine wave power input to said heater element;
   electrode means comprising two electrodes located on said substrate parallel to said longitudinal heater element, one of said electrodes located on each side of said heater element;
   differential amplifier means having two inputs one input connected to one of said electrodes and the other input connected to the other of said electrodes, said differential amplifier comprising means providing an output which is a function of the difference between charges present at said two electrodes; and
   lock-in-amplifier means having two inputs one of which is connected to the output of said differential amplifier and the other of which is connected to said power supply means, for providing an output indicative of the flow rate of a fluid flowing over said substrate in a direction perpendicular to the longitudinal orientation of said heater element.

10. A thermal conductivity indicator comprising:
    a pyroelectric substrate having at least one surface;
    means for applying a fluctuating heat input to said substrate, said input causing a fluctuating surface charge distribution in response to temperature fluctuations of said substrate; and
    electrode means on said surface for sensing a fluctuating surface charge on said surface, said charge fluctuations comprising said thermal conductivity indication.

11. The thermal conductivity indicator according to claim 10, wherein said means for applying comprises:
    a fluctuating power supply; and
    a heater element disposed on said substrate and connected to said fluctuating power supply.

12. The thermal conductivity indicator according to claim 11, wherein said fluid has a known flow rate component in a known direction, wherein said electrode means comprises at least two sensor electrodes located on said substrate and essentially parallel to said heater element, said heater element being located between said sensor electrodes and separated therefrom by a distance d.

13. The thermal conductivity indicator according to claim 11 or 12, wherein said fluctuating power supply includes means for providing a sine wave output to said heater element.

14. The thermal conductivity indicator according to one of claims 10 through 12, wherein said substrate is lithium tantalate ($LiTaO_3$).

15. The thermal conductivity indicator according to claim 11 or 12, wherein said heater element is a vapor deposited nichrome strip.

16. The thermal conductivity indicator according to claim 11 or 12, wherein said electrode means comprises two vapor deposited sensor electrodes on said substrate, said electrodes disposed one on either side of said heater element, said electrode means further comprising a differential amplifier means, responsive to charge redistribution at said sensor electrodes, for providing an output which is a function of the difference between outputs of said sensor electrodes.

17. The thermal conductivity indicator according to claim 16, wherein said electrode means further includes a lock-in-amplifier connected to the output of said differential amplifier means, said fluctuating power supply including means providing a sine wave output to said heater element and a reference sine wave output to said lock-in-amplifier, said lock-in-amplifier providing an output indicative of the thermal conductivity of said fluid.

* * * * *